United States Patent Office 3,108,030
Patented Oct. 22, 1963

3,108,030
VENEER FINISHING METHOD
Bert S. Taylor, New York, N.Y., assignor to FMC Corporation, a corporation of Delaware
No Drawing. Filed Nov. 30, 1959, Ser. No. 855,963
6 Claims. (Cl. 156—332)

This invention relates to a novel method for the production of resin coated wood veneer, and to the new and improved resin coated product produced thereby. More particularly, this invention relates to a method of manufacturing resin coated wood veneers having a smooth, clear resin film firmly adhered thereto, and characterized by a highly durable resin surface.

The use of thin veneers of hard and decorative wood, applied to the surface of less expensive core materials, has long been known, and has long been accompanied by the problem of protection of the veneered surface from chips, scratches, burns, and other damage, at the same time maintaining or enhancing its original attractive appearance. Finishing surfaces for wood veneers have conveniently been applied by means of clear overlay sheets laminated directly to the veneer, these overlay sheets having previously been impregnated with the desired resin coating.

Heretofore, finishing surfaces for wood veneers having a clear, hard, durable and heat resistant surface have been obtained only through the use of certain thermosetting resins, such as melamine-formaldehyde resins, by a process whereby the overlay sheet is coated or impregnated with the resin in a heat-convertible stage, and then laminated directly to the surface of the veneer, under the conditions of temperature and pressure required to complete the cure of the melamine-formaldehyde resin. These resins, however, characteristically require the use of high pressures and temperatures for curing, and are accompanied not only by these process disadvantages but also lack of utility when applied to veneers on many inexpensive core materials, which may be unstable under the conditions required to cure the melamine resin. Although certain melamine resins have recently been described for use under milder curing conditions, the surface produced therefrom is generally inferior.

It has now been discovered that a resin surface of superior durability and stability may be applied to wood veneers, under conditions of substantially lower temperature and pressure than was heretofore possible with thermosetting resins, by means of a transparent overlay sheet which has been coated and impregnated with a partially cured polymer of a diallylic phthalate, laminated directly to the surface of the wood veneer. The preparation and production of these surfacing materials resulted from the discovery that a relatively small change in the diallylic phthalate resin content in the overlay paper produced a substantial change in the thickness, and in fact the very existence of a homogeneous film on the surface of the veneer. By adjusting the resin content in the overlay paper and the ratio of polymer to monomer in the impregnant, a resin film may be produced on the surface of the veneer in a single and simple operation, at pressures approaching contact, to provide a protective surface of unusual stability and utility, on wood veneers supported on a large variety of core materials. The veneer itself is provided with an attractive surface free of dull spots and pitting, and is provided with superior abrasion and heat resistance and protected against the action of moisture, ultraviolet light, solvents, and harsh chemicals. Further, because of the mild curing conditions, less expensive core materials and thinner layers of veneer can be used than was heretofore possible.

The protective coatings of this invention are obtained, briefly, by impregnating an overlay paper with 75% to 90%, by weight of impregnated paper, of a diallylic phthalate, of which resin as least 90% is in the form of a thermoplastic, incompletely cured polymer containing residual unsaturation, and the rest of the diallylic phthalate is monomer. Present also are a peroxide catalyst to complete the cure of the diallylic phthalate to a thermoset resin, a mold release agent if required, and possibly a coloring agent for special effects.

When the overlay paper contains at least 75%, by total weight of impregnated paper, of diallyl phthalate, the final product has a uniform, adherent surface coating of thermoset diallyl phthalate resin. When less than this minimum resin content is used, the defect known as "dull spots" appears and, in fact, when less than about 70% of diallyl phthalate is present there is no resin film at all on the surface of the cured laminate. At about 75% resin, a one to two mil film appears on the surface, accompanied by an attractive and durable surface. When more than about 90% resin is present in the paper, discontinuities in the thickness of the surface resin film may occur, accompanied by loss of gloss and the defect known as "orange peeling." Within the range of 75% to 90% resin per total weight of impregated paper, a resin film ranging from about 2 to 7 mils in thickness is obtained on the surface of the overlay paper, with best results in the range of about 80% to about 90% resin, and a surface film 4 to 6 mils in thickness.

The resinous components of the overlay are derived from thermosetting polymers of diallylic phthalates, such as diallyl and dimethallyl esters of ortho-, iso- and terephthalic acids. Diallylic phthalates polymerize by addition polymerization through the allylic unsaturation, first forming a soluble, thermoplastic polymer which is relatively stable and is soluble in a wide variety of organic solvents, and which on further polymerization is changed to an infusible, insoluble thermoset resin having excellent physical and chemical properties.

Thermoplastic diallylic phthalate resins may be prepared by standard polymerization techniques, such as emulsion, solution or bulk polymerization, usually with a peroxide catalyst. The polymerization reaction is relatively slow, and may be stopped before gelation of the polymer, by procedures such as lowering the temperature or quenching the reactants, or destroying the catalyst, to form a thermoplastic polymer which contains residual vinyl unsaturation and is soluble in such common solvents as low molecular weight ketones, dioxane, ethyl acetate, and benzene. The molecular weight of the thermoplastic polymer is generally in the range of about 2500 to 25,000, with a number average below 10,000. A preferred process for the preparation of this polymer is described in U.S. application Serial No. 814,957, filed May 22, 1959.

To obtain the beneficial results described herein, at least 90% of the diallylic phthalate used in impregnating the overlay paper should be in the form of this thermoplastic polymer, and the remaining 0% to 10% as monomer. At over 95% polymer, slightly higher pressures may be needed for adequate flow during curing, to avoid pitting and flaking of the surface, and thus denser core materials may be required to accommodate the higher pressures. At less than 90% polymer, the dried overlay paper may become sticky and hard to handle.

Present also in the paper impregnating solution is a catalytic amount, normally about 2% to 5% by weight of the diallylic phthalate, of an organic peroxide, to catalyze the final cure of the resin. There is no advantage to the use of more than 5% catalyst. At least about 1% catalyst is required for complete cure. This catalyst may be any organic peroxide or hydroperoxide, such as tertiary butyl perbenzoate, benzoyl peroxide, tertiary butyl hydroperoxide, and other catalysts which are effective at the curing temperature but do not decompose during the drying cycle of the impregnated paper.

It is also preferable to include an effective amount, normally about 2% to 5% by weight of the diallylic phthalate, of an internal parting agent, such as lauric acid, carnauba wax or beeswax. External release agents or other processing techniques may also be used.

All of these components are dissolved in a volatile solvent, which may be any of the usual solvents useful for dissolving diallylic phthalate partial polymers. Useful solvents include low molecular weight ketones such as acetone, methyl ethyl ketone and methyl isobutyl ketone, aromatics such as benzene, toluene, xylene and isopropyl benzene, esters such as ethyl acetate and butyl acetate, other solvents such as dimethyl formamide, and many other solvents which can be evaporated out after impregnation of the paper. It may be preferred to use a mixture of solvents, in order to control the rate of evaporation from the paper. Solutions ranging from about 25% to 70% solids may be used, depending on the particular solvent system used. It is especially convenient to operate in the range of about 35% to 50% solids, for most solvents. The higher the resin concentration, the higher the resin pickup by the paper during impregnation. Since the viscosity of a solution of given resin content depends on the solvent, as well as do the temperature and rate at which the solvent may be evaporated off, the choice of solvent will depend to some extent on the particular processing technique which is adopted for preparing the overlay stock.

The overlay paper may be any of the commercially available clear overlay papers provided for laminating. These are absorbent papers, typically made of non-woven alpha-cellulose, cotton or viscose rayon, although other clear overlay papers, made of synthetics such as acrylic or polyester fibers, may also be used. The papers preferred for use herein are about 3 to 6 mils in thickness, and typically have a basis weight of 15–40 pounds per 3000 square feet. These papers may be absolutely clear, or they may be printed or tinted, to provide unusual decorative effects.

The paper may be impregnated using conventional equipment and techniques, wherein the paper is passed through a tank containing the impregnating solution. The amount of resin pickup may be controlled by adjusting the rate of passing the paper through the solution, varying the type of solvent system employed and the percent solids in the impregnating solution, or using metering rolls, doctor blades, transfer rolls, or other standard saturating techniques. The impregnation is conveniently carried out at room temperature, followed by evaporation of the solvent at elevated temperature.

Complete impregnation of the paper web is essential, since improper saturation will result in the formation of pits and craters in the surface of the cured resin. The amount of resin on the paper is readily determined by weighing samples of dried impregnated paper after each dip into the impregnating solution. Since heavily coated papers tend to adhere to the rolls of some types of coaters in commercial use, standard techniques, such as the use of a doctor blade on the unprinted side of the paper so that the thinner film dries rapidly enough not to stick to the rolls, may be employed in practice. To obtain the desired results of this invention, the impregnated paper should contain 75% to 90% by weight of diallylic phthalate, polymer plus monomer.

After the desired resin content has been obtained in the paper, the impregnated papers are dried to remove the volatile solvent. If the paper has been impregnated by a process requiring more than one dip through the laminating solution, at least a partial drying should be effected between successive dips. The drying temperature should be carefully controlled, to avoid premature cure of the resin at this stage. The drying temperatures and time will, of course, depend on the amount of solvent to be removed, the solvent system used and the speed of the paper through the drying ovens. Drying should be carried out gradually, to avoid the formation of craters in the final product. Drying temperatures in the range of about 150 to 275° F., in a two zone system, will completely remove acetone solvent, whereas slightly higher ranges may be used for other solvents. In general, no more than 8% of volatiles should remain in the paper after drying, with a preferred residual volatile content in the range of 3% to 5%. Residual volatile content, after normal drying, is measured by the weight loss observed on subjecting the dried paper to a temperature of 320° F. for 10 minutes.

These impregnated papers may be bent and rolled without cracking, and cut without flaking or chipping, and may be stored for prolonged periods without blocking or advancement in cure.

The resin coated veneers of this invention can be based on almost any core material, of high, medium and low density, employing the process of this invention. Wood veneers are normally made of hardwood, such as walnut, mahogany, birch or maple, and are applied commercially in thicknesses of 1/16 inch, 1/28 inch, or thinner, since thick veneers are less economical to use. These veneers are generally glued to a core material of the desired thickness, weight and composition, using any strong adhesive. Typical core materials include plywood, hardboard, particle board, cement-asbestos and gypsum board. All these boards should have plane and parallel surfaces, and uniform compressibility. The board should either be thermally stable at the laminating temperature, or special precautions may be required. For example, if a urea formaldehyde resin binder is present, or the boards are of high moisture content, it is preferred to pre-dry the boards to a minimum moisture and volatile content. Since it is desirable to avoid steam formation and the formation of other volatiles during lamination, for example the calcining of gypsum board with heat, such boards should be pretreated before lamination.

To prevent warping, either the core material should be balanced with a resin surface on both sides, or the reverse side should be protected with some inexpensive resin film, typically a sheet of phenolic resin impregnated kraft paper with a glassine paper separator. The type and character of the core material used for the veneer will determine the extent to which balancing or equalization is required. All types of hardboard and most plywoods must be balanced to a greater or lesser degree to compensate for the slight resin shrinkage that occurs and to equalize the rate of water absorption through the two faces. Boards which have a high internal bond strength and a high resistance to moisture, or are very thick, or are wood veneered on both faces, may not require additional equalization.

Laminating may be accomplished using a standard platen press with multiple openings. Layers of veneered board can be cured either "face-to-face," using a polishing plate finished on both sides, or "back-to-back" using two polishing plates, each finished on one side only. Either stainless steel or aluminum cauls, of any desired finish, such as matte, satin, furniture finish or gloss, may be used. The cauls should be "broken in " by the use of an external mold release on the first several pressings. Thereafter no external release is necessary during a continued operation. The desired surface finish may also be obtained through the use of release or separating papers such as cellophane or papers coated or treated with release agents such as silicones, which papers are inserted between the caul plate and the resin-impregnated overlay paper.

The impregnated paper is laminated to the board at a temperature and pressure and for a time sufficient to convert the diallylic phthalate to a thermoset resin. The laminating pressure need only be high enough to consolidate the resin and to provide small amounts of flow, and will depend upon such factors as the density and surface of the core and the flow characteristics of the impregnated paper. Pressures approaching contact pressure, and as high as 450 p.s.i., have been used successfully. At low laminating pressures diallylic phthalate resin flows sufficiently to produce a uniform finish of any desired gloss. For most laminates a convenient pressure is in the range of 100–250 p.s.i. Where maximum resin flow is required, such as with rough veneered cores, best results are obtained when the laminating pressure is increased to about 250–300 p.s.i. If it is desired to laminate at pressures in excess of 350 p.s.i., it may be advisable to use paper in which the resin flow has been retarded by advancing the cure of a small portion of the resin during the drying operation or in which the resin is free of monomer, since high laminating pressures are known to reduce the thickness of the resin film on the laminate. However, as previously stated, with impregnated papers containing less than about 75% resin, no resin film at all is obtained, even at very low laminating pressures.

The curing temperature should be high enough to activate the catalyst, and to provide a reasonable rate of cure. For commercial operation, the shorter the curing cycle the greater productivity, so that high curing temperatures are preferred from practical considerations. In practice the maximum laminating temperature is controlled by the stability of the cure. Curing temperatures up to 400° F. for up to five minutes have been used without charring such core materials as "Masonite." Lower temperatures of course require a longer curing time, and temperatures as low as 200° F. have been used for prolonged periods. A temperature range of about 250° F. to 400° F. is preferred, and within this range the rate of polymerization is reasonable, with no significant decomposition and degradation of the laminates. It is not necessary to cool the cured laminate in the press before removal.

The laminates thus produced have a flat, undistorted surface, since volumetric shrinkage is less than 1% in advancing from the thermoplastic resin to the fully crosslinked, thermoset polymer. The surfaces may have any desired finish, depending on the caul or release paper surfaces employed. The products have high dimensional stability, and outstanding resistance to abrasion, heat, wear, weathering, and the action of harsh chemicals.

The practice of this invention is illustrated further in the following examples. All parts by weight unless otherwise indicated.

*Example I*

A typical diallyl orthophthalate thermoplastic polymer was prepared as follows: 8860 pounds of diallyl orthophthalate monomer, 622 pounds of isopropanol (91% by volume) and 75 pounds of hydrogen peroxide (50.4% $H_2O_2$) were charged to a 1500 gallon stainless steel reactor, thoroughly agitated and heated to a pot temperature of 104–108° C. at total reflux. After 10 hours the viscosity of the reaction mixture had increased to 27 cps. at 106° C., as measured by a Bendix Ultraviscoson computator. The batch was cooled, to obtain a reaction product having a viscosity of 425 cps. at 25° C. This polymeric reaction product which consists of approximately 27% polymer, 67% unreacted monomer and 6% isopropanol, was mixed intimately with 48,000 pounds of isopropanol (91% by volume), and the converted polymer precipitated at 0° C. The solid polymer was separated by filtration and dried, to yield a 27.6% conversion of monomer to polymer. Properties of a polymer obtained by this process are:

PPV, cps. at 25° C _____ 354
Softening range _____ ° C__ 80–105
Iodine No. _____ 55
Sp. gr. at 25° C. (ASTM D792–50) _____ 1.267

The PPV given above is the "precipitated polymer viscosity," the viscosity measured at 25° C. of a 25.0% solution of polymer in monomer.

The product is a thermoplastic solid possessing residual unsaturation. It is readily soluble in low molecular weight ketones, benzene, ethyl acetate and other solvents, and insoluble in alcohols, water and aliphatic hydrocarbons. A resin-coated veneer employing this polymer was prepared as follows:

An unprinted unpigmented machine-finish alpha-cellulose overlay paper of four mils thickness, having a basis weight of 28 lbs./3000 sq. ft., was coated by the "dip and flow" method, by passing at the rate of 10 feet per minute into a solution of the following composition:

| | Parts |
|---|---|
| Diallyl phthalate polymer | 98 |
| Diallyl phthalate monomer | 2 |
| Lauric acid | 3 |
| Tert.-butyl perbenzoate | 3 |
| Acetone | 200 |

The coated paper was dried at 150° F. for 14 minutes, and then passed through the solution again, at the rate of 10 feet per minute. The paper was dried at 250° F. for 7 minutes, to produce a tack-free impregnated paper having a resin content of 87% and a volatile content of 5%. Resin content was measured by weighing samples of untreated and coated paper and assigning the weight gain as resin content. Percent volatiles was measured as the weight loss after heating for 10 minutes at 320° F. The paper was laminated to a walnut veneer 1/28 inch in thickness, preglued to a particle board 3/4 inch thick and having a density of 0.66 g./cm.$^3$, which had been pre-dried for 5 minutes at 350° F. The layup consisted of a slip caul (to protect the laminate from the surface of the press platen), followed by a sheet of glassine separator paper and a sheet of phenolic impregnated kraft paper (as a balancing sheet), the veneered core, the diallyl phthalate impregnated overlay paper, and a polished aluminum caul plate. The layup was cured in a laminating press by heating for 10 minutes at 325° F., under a pressure of 150 p.s.i. The laminate was removed from the press and the cauls stripped off, to produce a smooth, glossy finish laminate. Microscopic examination of a polished section of this laminate showed a smooth, even resin coating 4 mils in thickness on the surface of the laminate.

*Example II*

A clear, unpigmented, unprinted viscose rayon nonwoven paper, having a nominal denier of 3 and a nominal thickness of 5 mils, with a basis weight of 32 g./yd.$^2$ and having an insolubilized polyvinylacetate binder, was impregnated by passing the paper once, at a rate of 5 feet per minute, into a solution of the composition:

| | Parts |
|---|---|
| Diallyl phthalate polymer | 93 |
| Diallyl phthalate monomer | 7 |
| Lauric acid | 3 |
| Tert.-butyl perbenzoate | 2 |
| Methyl ethyl ketone | 80 |
| Toluene | 10 |

The paper was dried at 220° F. for 12 minutes, to produce a tack-free paper having a resin content of 79% and a volatile content of 6.3%. This paper was laminated to a pre-dried core of 1/28 inch birch veneer on 5/8 inch five-ply fir plywood, in a layup as described in Example I, using No. 6 satin finish aluminum cauls, for 15 minutes at 300° F. under a pressure of 85 p.s.i. The resulting product had a 3 mil resin film on the surface, and a satin finish.

It is apparent that this invention is susceptible to numerous modifications within the scope of the disclosure, and it is intended to include such variations within the scope of the following claims.

I claim:
1. The method of producing a resin finished wood veneer having a film of thermoset diallyl phthalate resin adherent thereto, which comprises the steps of: impregnating a sheet of unpigmented overlay paper about 3 to 6 mils in thickness and having a basis weight of 15-40 pounds per 3,000 square feet with a solution comprising (a) diallyl phthalate, 90-100% of said diallyl phthalate being thermoplastic polymer and the other 0-10% being monomer, (b) a catalytic amount of an organic peroxide, (c) an effective amount of a release agent and (d) a volatile solvent, and drying said impregnated paper, until said paper is impregnated with a total of 75% to 90% of diallyl phthalate, by weight of dried impregnated paper, and has a residual volatile content of less than about 8%, measured as material volatile after heating the dried paper for 10 minutes at 320° F.; laminating the dried impregnated overlay paper to the surface of said wood veneer, at a temperature and pressure and for a time sufficient to convert the diallyl phthalate to a thermoset resin, thereby producing a wood veneer coated with a clear resin surface.

2. The method of claim 1, wherein said overlay paper is an alpha-cellulose paper.

3. The method of claim 1, wherein said overlay paper is a non-woven viscose rayon paper.

4. The method of producing a resin-finished wood veneer which comprises the steps of impregnating a sheet of unpigmented overlay paper about 3 to 6 mils in thickness with a solution comprising (a) diallyl phthalate, 90-95% of said diallyl phthalate being thermoplastic polymer and the other 5-10% being monomer, (b) 1 to 5% by weight of diallyl phthalate of an organic peroxide, (c) 2 to 5% by weight of diallyl phthalate of a release agent and (d) a volatile solvent, and drying said impregnated paper, until said paper is impregnated with a total of 75% to 90% of diallyl phthalate by weight of dried impregnated paper, and has a residual volatile content of 3-5% measured as material volatile after heating the dried paper for 10 minutes at 320° F.; laminating the dried impregnated overlay paper directly to the dry surface of said wood veneer, at a temperature of about 250-400° F. and a pressure of about 50-350 p.s.i., for a time sufficient to convert the diallyl phthalate to a thermoset resin, thereby adhering the said paper to the surface of said veneer while simultaneously covering the said paper with a uniform, clear film of resin ranging from 2 to 7 mils in thickness.

5. Dry, flexible laminating stock which comprises unpigmented overlay paper of about 3 to 6 mils thickness and having a basis weight of 15-40 pounds per 3,000 square feet impregnated with about 75-90% of diallyl phthalate, by weight of impregnated paper, 90-100% of said diallyl phthalate being thermoplastic polymer and the remaining 0-10% being monomer; a catalytic amount of an organic peroxide and an effective amount of a release agent; said overlay paper having a residual volatile content less than about 8%, by weight of paper, measured as material volatile after heating the dried paper for 10 minutes at 320° F.

6. Dry, flexible laminating stock which comprises unpigmented overlay paper of about 3 to 6 mils thickness and having a basis weight of 15-40 pounds per 3,000 square feet impregnated with 75-90% of diallyl phthalate, by weight of impregnated paper, 90-95% of said diallyl phthalate being thermoplastic polymer and the remaining 5-10% being monomer; 2-5% of an organic peroxide catalyst and 2-5% of a release agent, said percentages based on weight of diallyl phthalate; said overlay paper containing a residual volatile content of 3-5%, by weight of paper, measured as material volatile after heating the dried paper for 10 minutes at 320° F.

References Cited in the file of this patent
UNITED STATES PATENTS

| | | |
|---|---|---|
| 2,320,536 | Pollack et al. | June 1, 1943 |
| 2,339,058 | D'Alelio | Jan. 11, 1944 |
| 2,565,251 | Malmstrom | Aug. 21, 1951 |
| 2,595,852 | Hopper et al. | May 6, 1952 |
| 2,605,205 | Patterson et al. | July 29, 1952 |
| 2,631,960 | Dafter | Mar. 17, 1953 |
| 2,990,388 | Johnston et al. | June 27, 1961 |
| 3,049,458 | Williard | Aug. 14, 1962 |